US012422124B2

(12) United States Patent
Frankiewicz et al.

(10) Patent No.: US 12,422,124 B2
(45) Date of Patent: Sep. 23, 2025

(54) MULTI-REGION OPTIC FOR FLAT ILLUMINATION AND COLOR CONSISTENCY

(71) Applicant: ABL IP Holding LLC, Atlanta, GA (US)

(72) Inventors: Gregory P. Frankiewicz, Elmhurst, IL (US); Jonathan Ferry, Chicago, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 18/820,898

(22) Filed: Aug. 30, 2024

(65) Prior Publication Data

US 2024/0418343 A1 Dec. 19, 2024

Related U.S. Application Data

(63) Continuation-in-part of application No. 18/606,680, filed on Mar. 15, 2024.

(60) Provisional application No. 63/453,024, filed on Mar. 17, 2023.

(51) Int. Cl.

| | |
|---|---|
| ***F21V 5/04*** | (2006.01) |
| ***F21S 8/02*** | (2006.01) |
| ***F21V 7/00*** | (2006.01) |
| ***F21V 9/40*** | (2018.01) |

(52) U.S. Cl.

CPC .............. *F21V 5/045* (2013.01); *F21S 8/026* (2013.01); *F21V 7/0091* (2013.01); *F21V 9/40* (2018.02)

(58) Field of Classification Search

CPC .......... F21V 5/045; F21V 9/40; F21V 7/0091; F21S 8/026

See application file for complete search history.

(56) References Cited

U.S. PATENT DOCUMENTS

| | | | | |
|---|---|---|---|---|
| 10,323,824 | B1 * | 6/2019 | Lim | F21V 5/02 |
| 2018/0231209 | A1 * | 8/2018 | Schwalenberg | G02B 3/08 |
| 2019/0145603 | A1 * | 5/2019 | Shih | F21V 5/045 362/309 |
| 2019/0331314 | A1 * | 10/2019 | Engelen | G02B 19/0066 |
| 2023/0100351 | A1 * | 3/2023 | Mizukami | F21V 5/045 362/297 |

(Continued)

OTHER PUBLICATIONS

"6" Lens Glass Fresnel", Available online at: https://www.acuitybrands.com/products/detail/88156/lithonia-lighting/6-lens-glass-fresnel/6-residential-recessed-downlighting, Accessed from internet on Mar. 21, 2024, 2 pages.

(Continued)

*Primary Examiner* — Christopher E Dunay

(74) *Attorney, Agent, or Firm* — Kilpatrick Townsend & Stockton LLP

(57) ABSTRACT

A multi-region lighting system for flat illumination with color balancing includes one or more light sources and an optic. The optic includes a first ridge structure. The first ridge structure is disposed in a first region at a center of the optic. The first region is for diverging light in an outward direction from the center. A second ridge structure is disposed in a second region at an outer portion of the optic for directing light downward using total internal reflection, where a direction from the one or more light sources toward the optic defines a downward direction.

20 Claims, 13 Drawing Sheets

(56) References Cited

U.S. PATENT DOCUMENTS

2023/0151944 A1* 5/2023 Castillo .................... F21V 3/02
385/27

OTHER PUBLICATIONS

"Upmold", Available online at: https://upmold.com/surface-finish-ra-rz/, Accessed from internet on Mar. 21, 2024, 8 pages.

* cited by examiner

MULTI-REGION OPTIC FOR FLAT ILLUMINATION AND COLOR CONSISTENCY

CROSS-REFERENCES TO RELATED APPLICATIONS

This application is a continuation-in-part application of U.S. patent application Ser. No. 18/606,680, filed Mar. 15, 2024, which claims the benefit of priority of U.S. Provisional Patent Application No. 63/453,024, titled "MULTI-REGION OPTICS FOR FLAT ILLUMINATION" and filed Mar. 17, 2023, the entirety of each application is incorporated by reference for all purposes.

BACKGROUND

A light fixture is an electronic device used to emit light and is sometimes referred to as a light fitting or luminaire. A light fixture can provide illumination inside a building, such as in a room of a house or business, or outside, such as to illuminate a tree or sidewalk. A light fixture can be battery powered, plugged into an electrical socket, or hardwired to an electrical source, such as a recessed can or a ceiling light hard wired in connection with a main electrical service panel of a building.

A light fixture comprises a lamp, sometimes referred to as a bulb, configured to generate light. The lamp can comprise one or more light sources, such as multiple light-emitting diodes (LEDs) to generate light from an applied electrical current.

The light fixture can have features, such as a reflector for directing light, a housing, an aperture, and/or a lens. The housing can be used for aligning the lamp and/or for protecting the lamp. Special-purpose light fixtures are used for a wide variety of purposes from automobile lighting to medical lighting.

SUMMARY

In certain embodiments, a system for a light fixture includes one or more light sources and an optic. The optic comprises a first ridge structure, wherein the first ridge structure is disposed in a first region at a center of the optic, for diverging some light from the one or more light sources in a more outward direction from the center; and a second ridge structure disposed in a second region at an outer portion of the optic for directing some light from the one or more light sources in a less outward direction using total internal reflection, wherein a direction from the one or more light sources toward the optic defines a downward direction and a direction orthogonal to downward is outward. In some configurations the second region is concentric with the first region; the second ridge structure comprises a series of ridges arranged to converge some light from the one or more light sources at least partially inward, toward the center; the optic has a first surface and a second surface opposite the first surface; the first surface is arranged to face the one or more light sources; both the first ridge structure and the second ridge structure are part of the first surface; the first region has a first texture, the second region has a second texture, and the first texture is different from the second texture; the first texture is finer than the second texture the optic further comprises a third region between the first region and the second region, wherein the third region comprises no ridge; the first region has a first texture; the second region has a second texture; the third region has a third texture; the first texture is different from the second texture and the third texture; the second texture is different from the third texture; the optic has a first surface facing the one or more light sources and a second surface opposite the first surface, and the second surface comprises a uniform texture; the second region adjoins the first region; the second ridge structure comprises a first ridge having a first side and a second side; the first side is closer to the center than the second side; the first side is arranged to refract some light from the one or more light sources into the first ridge; the second side is arranged to reflect light less outward than light incident on the first side and out of the first ridge using total internal reflection; the first ridge structure comprises a first subset of ridges arranged to diverge some light from the one or more light sources in a more outward direction from the center; the first ridge structure further comprises a second set of ridges arranged to direct some light from the one or more light sources in a more inward direction, toward the center of the optic, after light passes through the optic; the second ring structure comprising one or more ridges arranged to diverge some light from the one or more light sources in a more outward direction from the center; the first ridge is a curved ridge in an elliptical shape; the system further comprises a reflector and a trim; the trim has a height with respect to a diameter of the optic to provide a 55 degrees or smaller cutoff angle; the first ridge is a ring ridge; the first ridge structure comprises a set of concentric annular sections functioning as a divergent lens; the trim has an output aperture of 4 to 6 inches; and/or the optic further comprises an edge having no texture.

In some embodiments, a method comprises generating light from one or more light sources and transmitting a first portion of light from the one or more light sources through a first region of an optic. The first region is at a center of the optic; the first region comprises a first ridge structure arranged for diverging at least some of the first portion of light in a more outward direction from the center. The method further comprises transmitting a second portion of light from the one or more light sources through a second region of the optic, wherein: the second region is at an outer portion of the optic compared to the first region; and/or the second region comprises a second ridge structure arranged to direct at least some of the second portion of light downward and less outward, using total internal reflection, wherein a direction from the one or more light sources toward the center of the optic defines a downward direction. In some embodiments, the second ridge structure comprises a first ridge having a first side and a second side; the first side is closer to the center than the second side; the first side is arranged to refract some light from the one or more light sources into the first ridge; the second side is arranged to reflect light less outward than light incident on the first side and out of the first ridge using total internal reflection; and/or the optic is arranged to provide flat illumination from the one or more light sources.

In some embodiments, an optic for a light fixture comprises a first ridge structure, wherein the first ridge structure is disposed in a first region at a center of the optic, for diverging some light from one or more light sources in a more outward direction from the center; and a second ridge structure disposed in a second region at an outer portion of the optic for directing some light from the one or more light sources in a less outward direction using total internal reflection, wherein a direction from the one or more light sources toward the optic defines a downward direction and a direction orthogonal to downward is outward.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
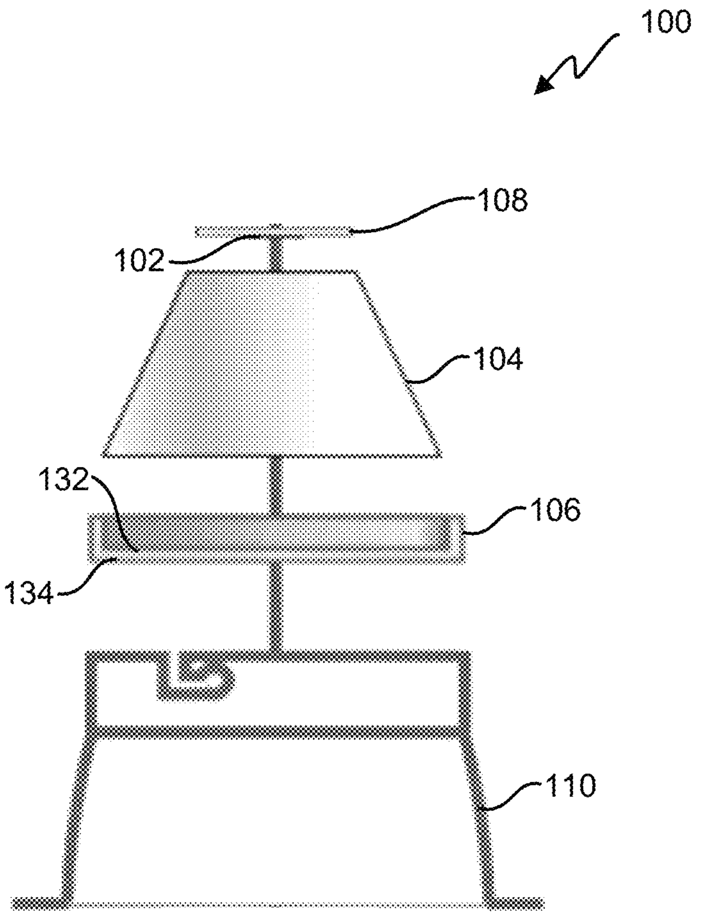
FIG. 1 illustrates an embodiment of a light fixture.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The present disclosure generally relates to lighting. More specifically, and without limitation, the present disclosure describes a multi-region optic for flat (e.g., uniform) illumination with color consistency.

Uniform illumination can be a desirable lighting outcome in various applications where even light distribution is used for visual comfort, functionality, and/or aesthetic purposes. Uniform color consistency can be a desirable output in various applications where even color distribution is used for visual comfort, functionality, and/or aesthetic purposes. Modifying the output of a light fixture can be achieved through various techniques and/or components designed to manipulate light emitted from a light source (e.g., to provide consistent and well-dispersed illumination). Optics, comprising features such as ridge structures and/or textures, can be used to modify light emission, such as redirecting light. Optics can be made from translucent materials (e.g., frosted glass, acrylic, and plastic), which allow light to pass through while refracting, reflecting, or dispersing light in various directions. Incorporating an optic by an appropriately designed reflector and/or trim into a lighting system can enhance an overall performance and/or visual appeal of the setup. Improved illumination systems, apparatuses, and/or methods are desired.

U.S. patent application Ser. No. 18/606,680 describes embodiments of a multi-region optic for flat (e.g., uniform) illumination. The present disclosure addresses color inconsistency issues that may arise under some conditions while trying to provide flat illumination.

This disclosure, without limitation, generally relates to a light fixture comprising a light source and an optic. The optic comprises a first region disposed at the center of the optic and a second region disposed at the outer portion of the optic. The first region comprises a first ridge structure for diverging light in an outward direction from the center, and the second region comprises a second ridge structure for directing light downward (e.g., using total internal reflection), wherein a direction from the one or more light sources toward the optic defines a downward direction.

FIG. 1 illustrates an embodiment of a light fixture 100. The light fixture 100 can be recessed or flush mounted (e.g., in a ceiling). The light fixture 100 comprises one or more light sources 102 (e.g., a multi-LED lamp), a reflector 104, an optic 106, and a mount 108. The one or more light sources 102 are disposed within the reflector 104 between the mount 108 and the optic 106. The reflector 104 and mount 108 can be considered part of a housing of the light fixture 100. In some embodiments, the mount 108 is a printed circuit board (PCB). LEDs are attached to the PCB to make a PCB assembly, and then the PCB assembly is mounted to a heat sink.

The light fixture 100 can further comprise a trim 110, which can be used to recess the light fixture 100 from a surface, such as a ceiling. The trim 110 can be used to focus light and/or otherwise shape light from the optic 106. The trim 110 is a visible portion of the light fixture 100 (e.g., with the optic 106, if viewed from a steep enough angle). The reflector 104 reflects light from the light source(s) 102 toward the optic 106, the optic then modifies the light (e.g., refracts, diffuses, focuses, etc.). The optic 106 is arranged in conjunction with the trim 110 so the output surface of the optic 106 is at the top input aperture of the trim 110. The light fixture 100 can also include a heat sink (e.g., thermally coupled with the light source 102).

The optic 106 has a first surface 132 and a second surface 134, the second surface 134 being opposite the first surface 132. The first surface 132 is arranged to be closer to the light source 102 than the second surface 134. For example, light from the light source 102 is first transmitted through the first surface 132 and then through the second surface 134.

Figure 2A:
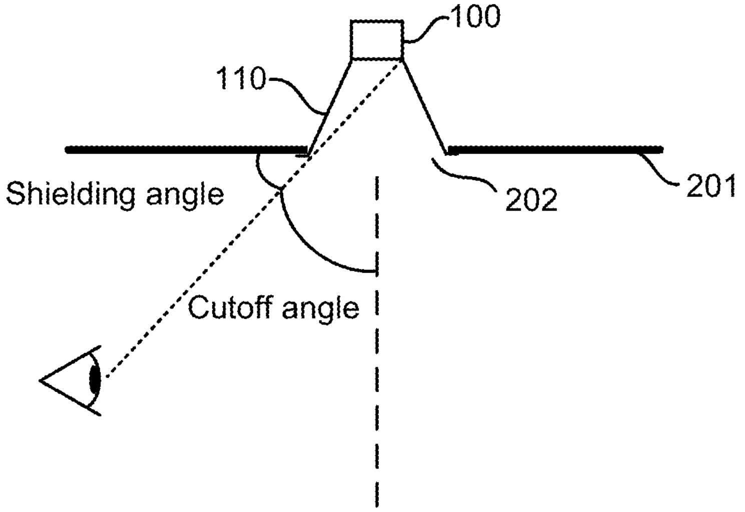
FIGS. 2A and 2B depict examples of cutoff angles of light fixtures.

FIG. 2A illustrates a light fixture 100 installed in a ceiling 201. The light fixture 100 can be a recessed downlight designed to effectively reduce or minimize glare and control light distribution. The output aperture 202 of the trim 110 is flush with a surface of the ceiling 201. The majority of the light fixture 100 is concealed, creating a clean and unobtrusive appearance. The trim 110 provides a cutoff angle that shields the light source from an observer's direct view. The cutoff angle is the maximum angle, measured from the vertical, at which light is allowed to project from the light fixture 100 to the observer. As shown in FIG. 2A, the height of the trim 110, the diameter of the optic, and the diameter of the output aperture of the trim 110 define the cutoff angle. A shielding angle is the compliment of the cutoff angle.

Figure 2B:
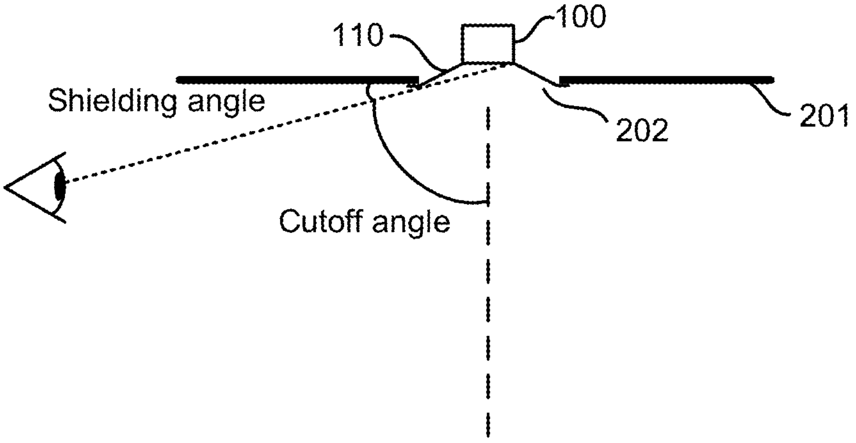

As illustrated in FIG. 2B, decreasing the height of trim 110 can expand the cutoff angle, which in turn leads to earlier visibility of the source and possibly a significant increase in glare. Therefore, to reduce glare and/or to make the lighting more comfortable for the eyes, the light fixture 100 is designed to control the cutoff angle to 55 degrees or smaller. In some embodiments, the cutoff angle is 50 degrees or smaller. For instance, in some embodiments the trim 110 has an output aperture of 6 inches and a cutoff angle of 50 degrees or smaller.

Figure 3:
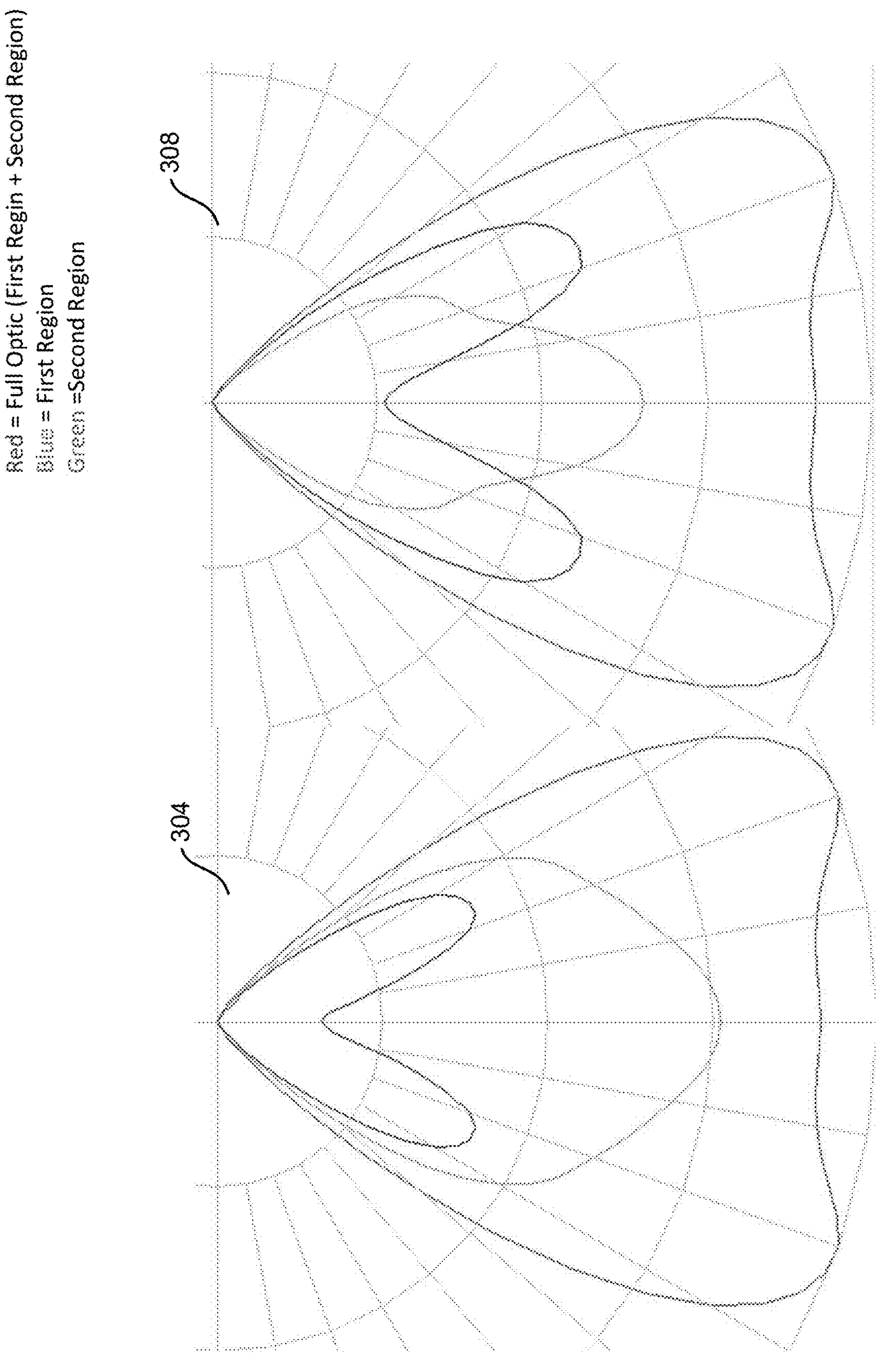
FIG. 3 depicts batwing shape illumination for some embodiments of light fixtures.

The optic in the parent patent application, U.S. patent Ser. No. 18/606,680, in some configurations, is designed to produce uniform light distribution across a broad area. FIG. 3 depicts graphs of illumination for a couple embodiments of an optic. To meet design parameters for cutoff angle while simultaneously spreading light in a wide, symmetrical and effective pattern, a light fixture is designed to achieve a batwing-shaped light distribution. In FIG. 3, a blue line shows light contribution from a first region of an optic, and a green line shows light contribution from a second region of the optic. A red line shows a combination of the first region and the second region. A first graph 304 shows light distribution from a first optic. A second graph 308 shows light distribution from a second optic. Both the first optic and the second optic produce flat illumination, but the second optic provides better color consistency because the first region of the second optic diverges more light out of the center of the beam, and the second region of the second optic focuses less light into a center of the beam. The first optic has a first region that is 25 mm in diameter, whereas the second optic has a first region with a larger diameter of 40 mm. Though both optics produce flat illumination, light from the second optic is color balanced by directing cooler light from the center outward and reducing an amount of warmer light reflecting from a trim to a center of the beam.

Figure 4A:
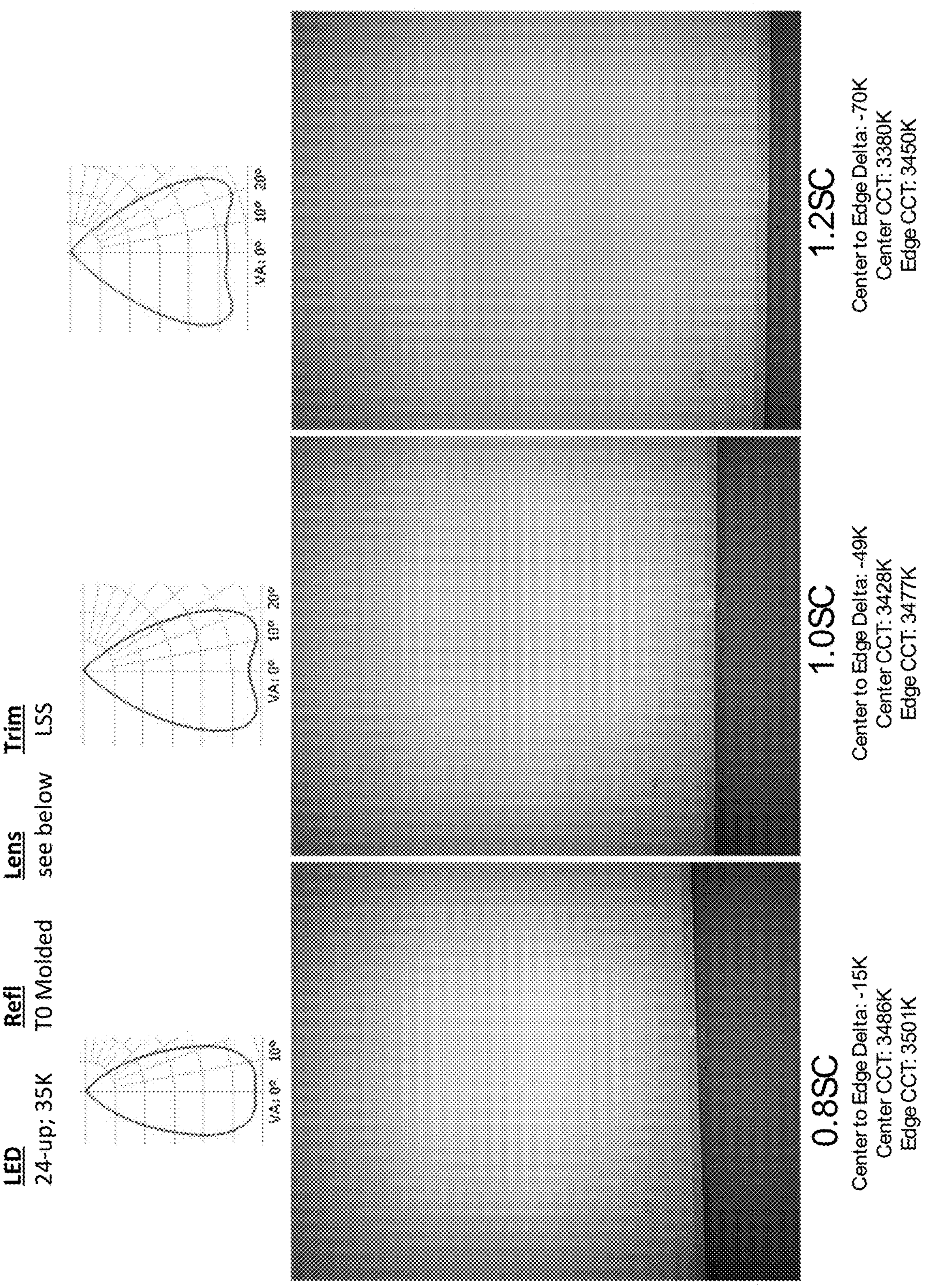
FIG. 4A depicts illumination graphs and images of lighting for some embodiments of light fixtures with different Spacing Criterions.

While trying to produce flat illumination, a color inconsistency issue may appear, particularly when the light fixture is of a large size. FIG. 4A illustrates an illumination distribution of a light fixture designed to achieve a batwing-shaped light distribution (e.g., using the first optic of the first graph 304 in FIG. 3). When the Spacing Criterion (SC) of the batwing-shape increases, yellowish or amber tones appear in a center or middle region of the illumination. As illustrated in FIG. 4A, compared to 0.8 SC and 1.0 SC, when the spacing criterion of the light fixture is increased to 1.2 SC, yellowish or amber tones appear in the middle of the illumination provided by the light fixture equipped with a 24-up 35K LED and TO modeled reflector. When discussing the sizes of light fixtures, reference to the diameter of the output aperture corresponds to the size of the ceiling hole. For example, a four-inch system accommodates a 102 mm diameter ceiling hole, while a six-inch model fits a 152 mm diameter ceiling hole.

Figure 4B:
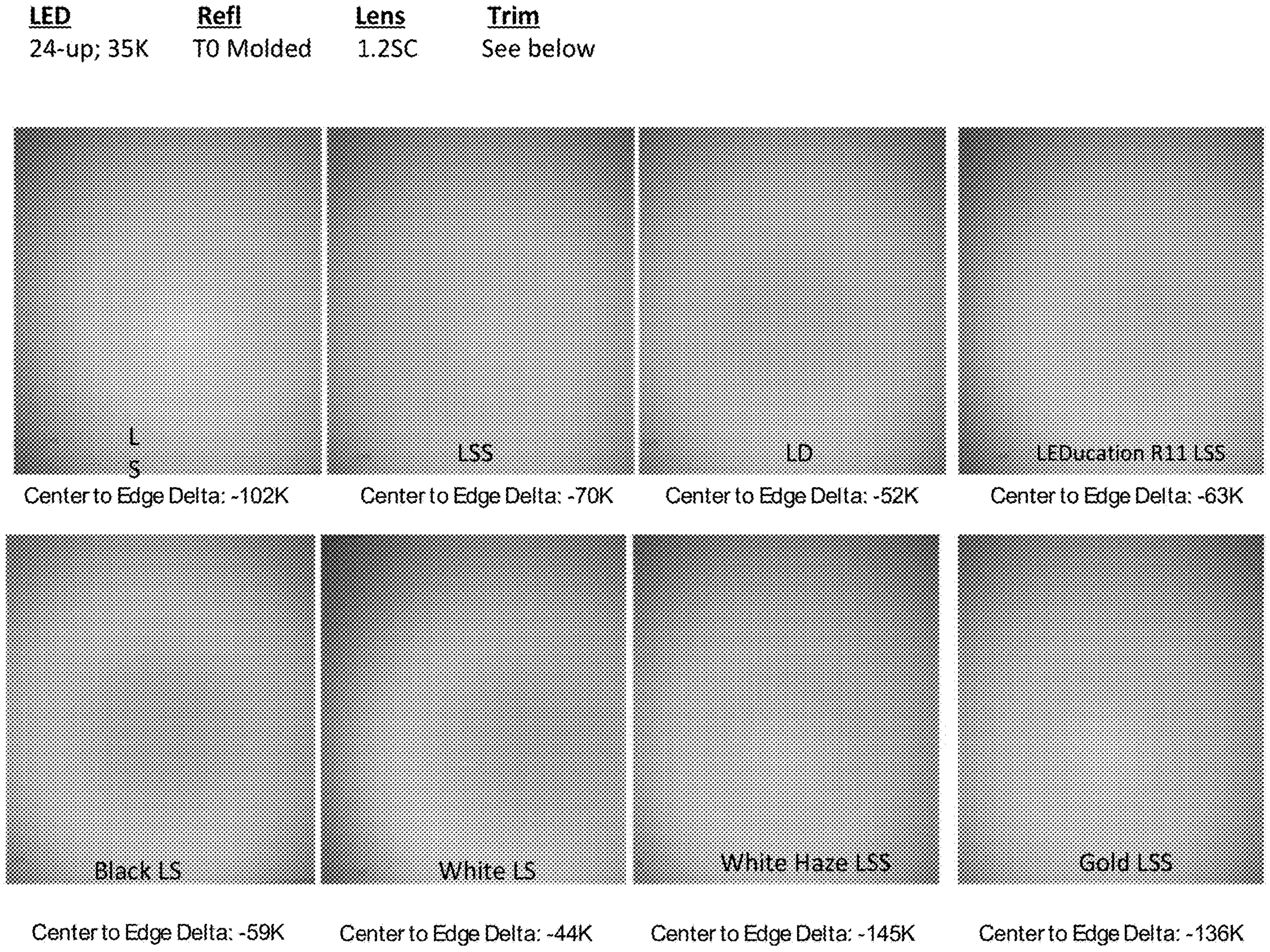
FIG. 4B depicts illumination images for embodiments of light fixtures with different trims.

FIG. 4B further shows the relationship between the yellowish or amber tones with trims. As illustrated in FIG. 4B, with the same 24-up 35K LED, TO modeled reflector, and 1.2 Spacing Criterion, a Gold LSS trim, White Haze LSS trim, and LD trim will result in more noticeable color inconsistencies.

Figure 5B:
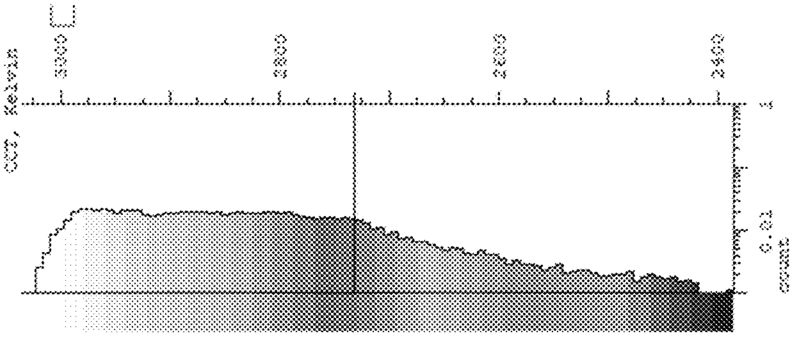
FIGS. 5A and 5B depict temperature illumination of an embodiment of a light source used in a light fixture.
Figure 5A:
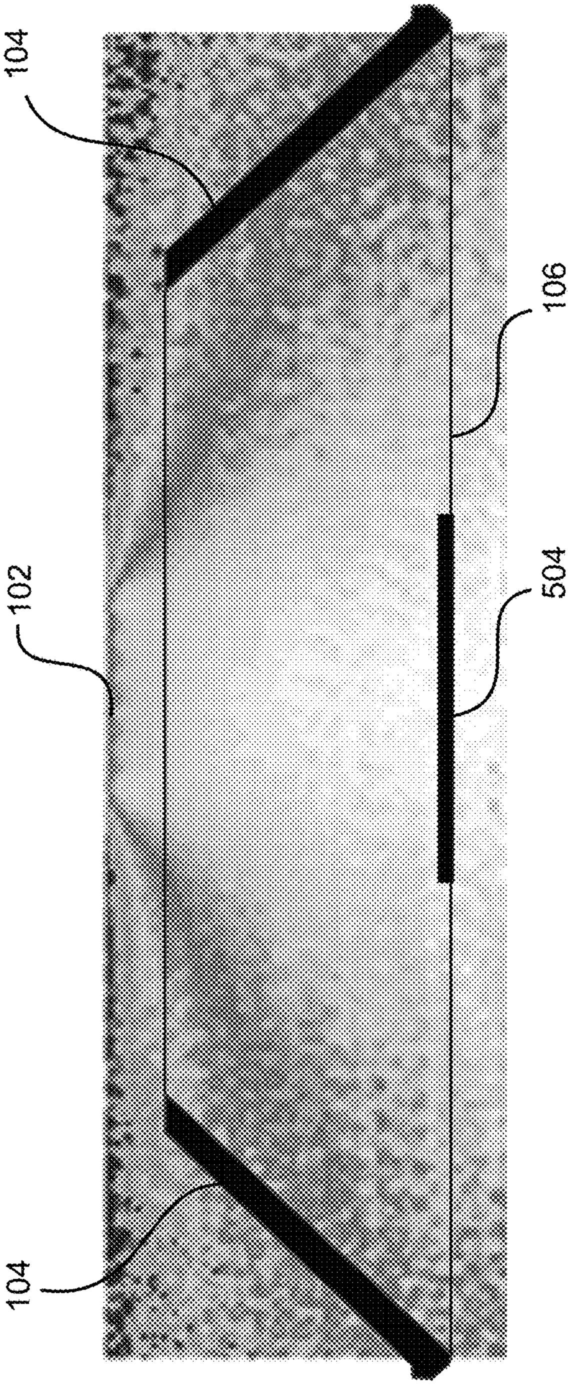

FIGS. 5A and 5B depict temperature illumination of an embodiment of a light source used in a light fixture. FIG. 5A depicts a side view of light temperature in the light fixture. FIG. 5B is a histogram of different temperature values, in Kelvin (K) scale, of light in the light fixture. Left and right black lines represent the reflector 104. A bottom black line represents the optic 106. Generally, as a Kelvin value increases, light appears cooler (e.g., whiter), and as the Kelvin value decreases, the light appears warmer in color (e.g., more yellow or amber). As illustrated, a center 504 of the optic 106 is located in a center of the beam, with the light at around 3100 Kelvin on the color temperature scale. However, the trim (e.g., below the reflector; not shown) reflects warmer tones (e.g., shown in blue and pink), with a peak around 2700 K-2750 K. Light around 2700 Kelvin is yellowish, or amber, in hue. Predominantly warmer tones of light will reflect off the trim and be focused to a middle portion of the beam (e.g., on a floor). A result is that the middle portion of the beam has a more yellowish color after reflecting off the trim.

Generating uniform lighting with color consistency from a light source with certain trims (e.g., tall trims for having a smaller cutoff angle, such as trim 110 in FIG. 1) can be challenging. In some configurations, a trim profile may be redesigned. However, redesigning the trim can incur additional costs. Additionally, efficiency can be considered an important factor in some light sources. In some embodiments, the optic (e.g., optic 106 in FIG. 1) is designed to provide more uniform light distribution with color consistency by directing some of the warmer light at edges of the optic downward so that less warmer tones reflect from the trim to the middle portion of the beam and/or directing the cooler tones away from the center. Doing so can better mix the warmer and cooler tones in the middle of the beam (e.g., without redesigning the trim profile; efficiency is minimally impacted).

Figure 6A:
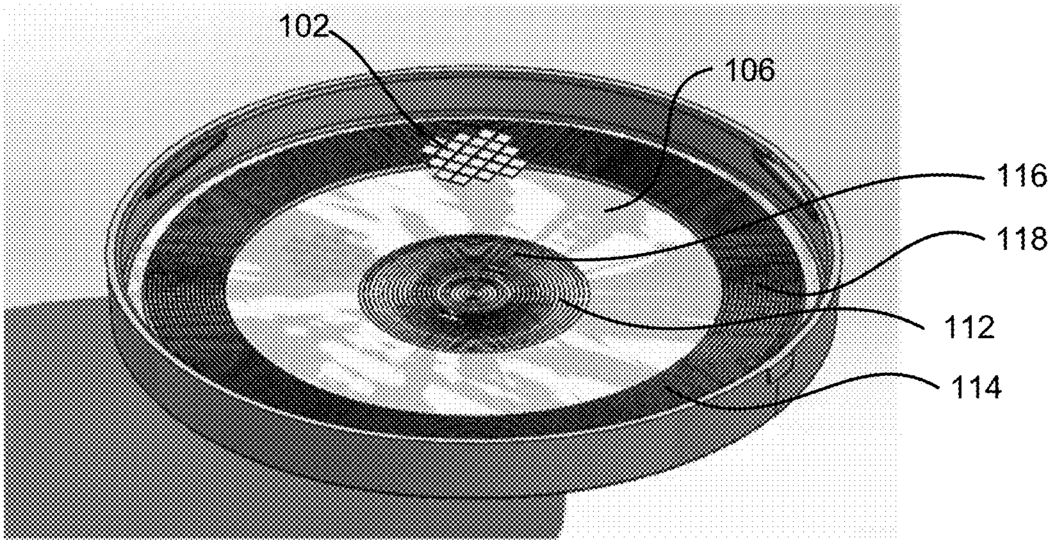
FIG. 6A depicts an embodiment of a light fixture.

FIG. 6A illustrates an embodiment of the optic 106. The optic 106 has a lens system comprising a first region 112 and a second region 114. The first region 112 is disposed at a center of the optic, and the second region 114 is disposed outward from the first region 112. The first region 112 comprises a first ridge structure 116 for diverging a portion of light away from the center. The second region 114 comprises a second ridge structure 118 for directing light downward (e.g., less outward) using total internal reflection, wherein a direction from the one or more light sources toward the optic defines a downward direction. The first ridge structure 116 and the second ridge structure 118 are arranged to produce a composite light distribution from the one or more light sources 102. This structure can get warmer light off the trim and get the cooler light out of the center of the beam. In some embodiments, the optic 106 may be circular, elliptical, square, or other shape.

In some configurations, the first ridge structure 116 can be arranged to diverge the portion of light from the one or more light sources 102 in an outward direction from the center. The first ridge structure 116 can comprise one or more ridges (e.g., a set of concentric annular sections that function as a divergent lens), a simple lens (e.g., double concave, plano-concave, negative meniscus, etc.), a compound lens, a freeform lens, and/or other types of lens that functions as a divergent lens. In some configurations, some light is purposely kept in the center in order to form a desired beam and/or correct for color. For example, the amount of light diverted can depend on a contribution from an outer region, how the lens interacts with the trim, and/or how the trim contributes to the beam. In some configurations, contributions from the first region 112 and the second region 114 are reversed dependent on trim and/or reflector geometries. Light from different regions is mixed to create a desired beam shape while also accounting to correct for color In some configurations, the first ridge structure 116 comprises a set of concentric ridges (e.g., curved ridges, ring ridges) for diverging the portion of light in an outward direction, away from the center. For example, the first ridge structure 116 can have a smooth (e.g., sinusoidal), triangular, sawtooth, step (e.g., rectangular grooves and ridges with binary height or multiple different rectangular heights), or other profile. The set of ridges in the first ridge structure 116 can have the same height (amplitude) and shape or have varying heights, angles, shapes, and/or surfaces. For example, the profile can be a sinusoidal profile with increasing amplitude. Each ridge, or the set of ridges as a whole, can be used to diverge light like a lens. For example, the set of ridges of the first ridge structure, as a whole, can be shaped to form a set of concentric annular sections that function as a divergent lens, and/or each ridge can be a separate lens that functions as a divergent lens.

Figure 6B:
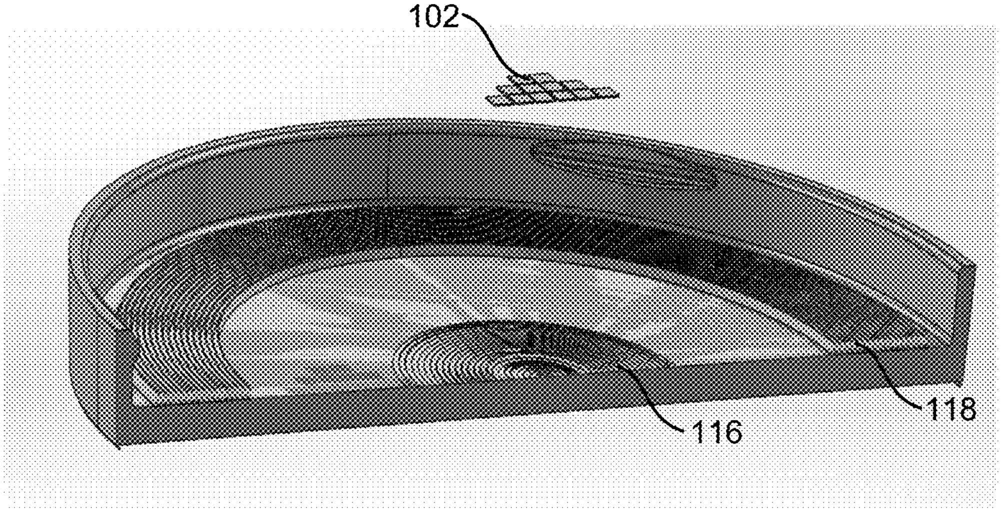
FIG. 6B depicts a sectional view of the light fixture in FIG. 6A.

In some configurations, the first ridge structure 116 comprises a set of concentric annular sections functioning as a divergent lens (e.g., diverting at least a portion of light out of the center). By leveraging a concentric ring structure and stepped surfaces, the first ridge structure 116 can diffract light in an outward (and downward) direction from the center. The first ridge structure 116 can diffract light into a desired shape (e.g., more uniform and/or evenly dispersed illumination; or purposely create a distribution that is not uniform, so that it fills in missing portions of a beam that comes from the second region and/or off the trim, so a resulting beam is a desired target distribution, batwing, or otherwise) without the bulk of a traditional lens. FIG. 6B illustrates a half-sectional view of the optic 106. Between the first region 112 and the second region 114 is a middle region that does not have ridges.

Figure 7:
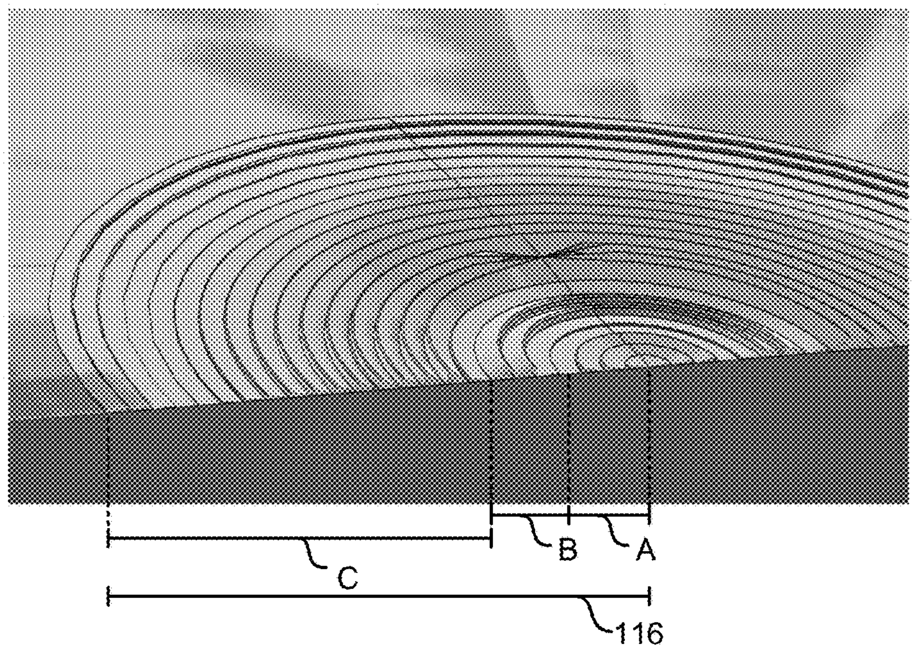
FIG. 7 depicts an embodiment of ridges in the first region of the optic.

FIG. 7 illustrates a local view of an embodiment of the first ridge structure 116. In some configurations, the first ridge structure 116 is a set of concentric grooves or steps. The angles of each step in the set of concentric steps, relative to the first surface of the optic 106 facing the light sources 102, may vary. For example, angles of each step in the set of concentric steps progressively increase or decrease from the center outward. In some configurations, angles of the set of concentric steps vary from sharp to obtuse, and finally to flat, moving from the center outward. As shown in FIG. 7, the first ridge structure can have different ridges structures in different subsections. For example, ridges in subsection A lean outward. Ridges in subsection B lean inward. Some ridges in subsection C lean outward and some lean inward. Leaning can mean that a maximum height of a ridge is offset from a middle of a cross section the ridge. Each ridge, or ring, can be shaped with a purpose for forming a desired shape to achieve enhanced, or optimal, color mixing. Part of the design challenge is that each ring will capture more or less intense light (e.g., the center of the lens is closer to the center of the LEDs, which light has more intensity). To a first order approximation, as a diameter of the concentric rings grows, an area of each ring grows, meaning more light hits that ring so it can control more light. To first order, a color of the light can change that passes through each ring. A design objective can be to take each ring and angle it to aim a portion of light to a specific portion of the beam for the purpose of shaping a final beam and/or color mixing. Some rings may aim some light towards the center, and/or some rings may aim light outwards. In the embodiment shown in FIG. 7, more light is pushed outward to make the edges warmer, but some of the warmer light is kept in the center to avoid making a hole. Another complication diverting light using Snell's Law is that there is an index mismatch between the lens (e.g., plastic) and air. There is a limit to how much a ridge (e.g., made of plastic) can be angled to efficiently bend light before the ridge acts like a retro reflector and reflects light back towards the LEDs. Accordingly, while it might be more efficient for some ridges to take an incoming light ray and generally divert it towards the outside of the beam (i.e., away from an optical axis, or center line, of the lens), in some cases it can be efficient to angle a ridge so that an incoming light ray essentially crosses the center line of the lens and diverges to an opposite side of the beam.

In some embodiments, the height (e.g., in the z dimension) and/or width of the first ridge structure 116 in the first region may be modified to achieve a desired distribution. Heights of ridges can be chosen for several reasons. First, a height of a ridge can be limited based on a manufacturing method of the lens. Ridges cannot be made any shape, but are constrained to a method by which shapes are formed in a negative of the tooling and will have some amount of radii on them. This can change based on manufacturing methods, or the complexity of tooling. The larger the ridges arc relative to the radii achieved by a tool, the less effect the rounded peaks and valleys have on performance. For example, if lenses shown in FIGS. 6-8 had big, rounded peaks and valleys, then the rounded peaks and valleys would consume the flat edges used to shape the beam, which would reduce the effectiveness of the ridges. Light that hits a rounded surface would pass through in a less optically controlled manner because of the changing angle of incidence of light on the rounded surfaces. But the larger ridges are made, the fewer the number of ridges in each region, so the less control to shape the beam. So, a height of each ridge is partially determined by the manufacturing method and a desired beam. Further, the angle used to form the desired beam from each ridge itself can affect the heights needed. Generally, to divert light in the first region, ridges are shorter and/or wider than ridges in the second region.

In some embodiments, the first ridge structure 116 comprises one or more ridges, or rings, for directing some light more inward and/or the second ridge structure (118 in FIG. 6B) comprises one or more ridges for directing some light more outward. For example, the second ridge structure is designed, and the first ridge structure 116 is modified to create a desirable combination of light by having different rings lean different directions for distributing cooler light to make a beam uniform in color and intensity. This can be seen in FIG. 7 with subsections A, B, and C having ridges that lean in various directions. For example subsection A can be a first subset of ridges and section B a second subset of ridges. A subset of ridges in a ridge structure can comprise one or more ridges. Having ridges lean in various directions, and in some cases rings with increasing or decreasing lean angle, height, and/or width, depending on how much cooler light to mix and where in the beam to mix the cooler light, to produce an optic that produces a uniform intensity and color distribution from the one or more light sources.

Figure 8A:
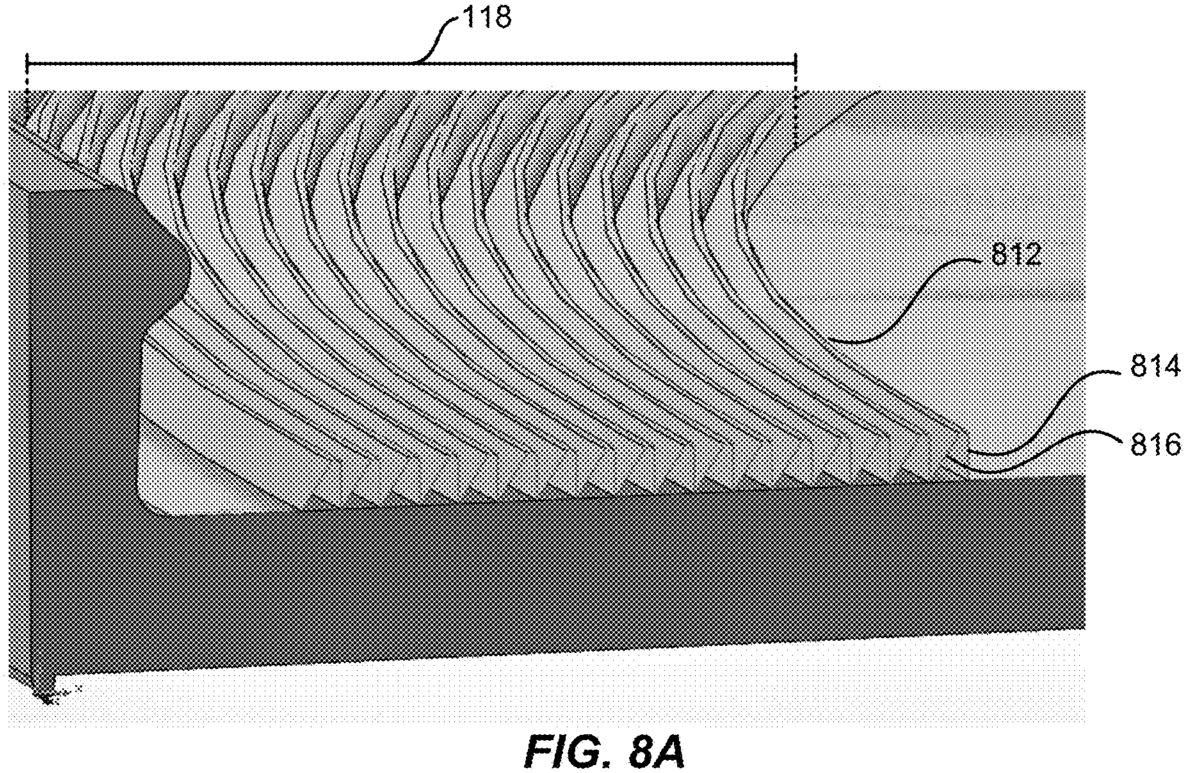
FIG. 8A depicts an embodiment of ridges in the second region of the optic.

FIG. 8A depicts an embodiment of the second ridge structure 118. The second ridge structure 118, in the second region 114, is arranged to direct light downward (e.g., have a greater downward vector component, and/or a less outward vector component) using total internal reflection. The direction from the one or more light sources toward the optic defines a downward direction. Generally, ridges in the second region are taller and/or narrower than ridges in the first region.

In some embodiments, the second region 114 is concentric with the first region 112. The second ridge structure 118 can comprise a set of ridges (e.g., concentric, curved ridges, ring ridges, annual sections). For example, the second ridge structure can have a smooth (e.g., sinusoidal), triangular, sawtooth, step (e.g., rectangular grooves and ridges with binary height or multiple different rectangular heights), or other profile. The set of ridges of the second ridge structure 118 can have the same heights (amplitude) and shapes or have varying heights, angles, and/or surfaces. For example, the profile can be a sinusoidal profile with increasing amplitude. Each ridge, or the set of ridges as a whole, can be arranged to focus light like a positive lens for directing light downward away from the light source using total internal reflection (e.g., so that less light passing through the second region 114 reflects off the trim).

In some embodiments, the second ridge structure 118 comprises a set of concentric ridges. As illustrated in FIG. 8A the second ridge structure 118 comprises a first ridge 812 having a first side 814 and a second side 816; the second side 816 being farther from a center of the optic than the first side 814. The first side 814 refracts light from the one or more light sources into the first ridge 812, and the second side 816 reflects light downward using total internal reflection, so that light exiting the ridge has a less outward component than light entering the first ridge 812.

Figure 8B:
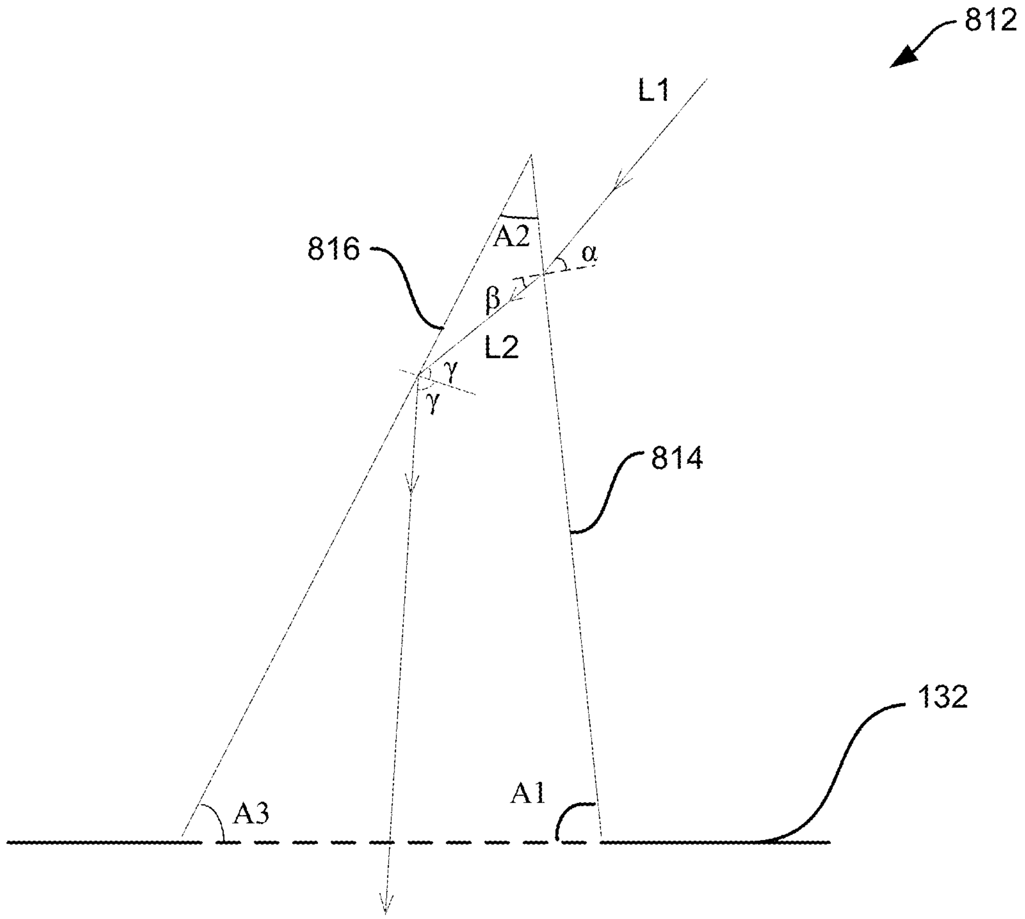
FIG. 8B depicts a sample light path of an embodiment of a first ridge in the second region.

FIG. 8B illustrates an example cross-section view of one ridge. Light LI from the light source strikes the first ridge 812, incident on the first side 814 of the first ridge 812 with a first angle $\alpha$, which is refracted by the first side 814 to light L2 with a second angle $\beta$. Light L2 is incident on the second side 816 with a third angle $\gamma$ and is reflected by total internal reflection (TIR), directing light downward. A direction from one or more light sources 102 toward the optic 106 defines a downward direction. The TIR reflection redirects light L2 from continuing at a high angle and hitting the trim 110.

As illustrated in FIG. 8B, the cross-section can be a triangle shape. Though the triangle shown in FIG. 8B has sharp corners, the corners of the triangle could be rounded (e.g., based on manufacturing). Light L1 incident on the first side 814 with an incident angle $\alpha$ relative to the normal line of the first ridge 812 can be bent by refraction while passing through the first side 814. The direction of the light changes to an angle of $\beta$ relative to the normal of the first side 814. When the refracted light reaches the second side 816, the angle $\gamma$ is greater than the critical angle for total internal reflection, and thus is reflected by total internal reflection by the second side 816, directing light downward.

The second ridge structure 118 decreases an amount of light hitting the trim 110 and further decreases the warmer light reflected by the trim 110 to the middle region. With enough light off the trim 110, cooler light is put in the middle region. Due to TIR, light is directed downward (e.g., less outward), and enough light can be directed to significantly reduce the warmer light in the middle region.

The second ridge structure 118 can be made from translucent materials similar to other parts of the optic 106, or different from the other parts of the optic 106. The second ridge structure 118 can be made from materials such as frosted glass, acrylic, plastic, polycarbonate, PVC, resin, or something similar. These materials can be intrinsic or can have their refractive index changed through doping to meet design parameters.

In some configurations, the first side 814 of the first ridge 812 has a first angle A1 (e.g., between 40 and 80 degrees, such as 50, 60, 65, 68, or 70 65 degrees) relative to the first surface 132 of the optic. The first side 814 and the second side 816 of the first ridge 812 form a second angle A2 (e.g., between 15 and 60 degrees, such as 25, 30, 40, or 45 degrees.) The second side 816 has a third angle (e.g., between 60 and 89 degrees, such as 65, 75, or 85 degrees) relative to the first surface 132 of the optic 106. Angles can vary. In some examples, ridges of the 2nd region look like ridges of the first region, and vice versa depending on a desired beam and how the trim is contributing to the beam. Angles and ranges can also vary if the material of the lens changes (e.g., PMMA vs PC vs silicone).

Angles, shapes, periodicity, and/or heights of the second ridge structure can be adjusted according to specific design parameters. For example, the second ridge structure can comprise outer ridges and inner ridges, wherein the outer ridges are taller than the inner ridges. In some configurations, the cross section of the first ridge 812 can be a shape other than triangle, such as curved surface triangular, trapezoid, or other shape.

Figure 9:
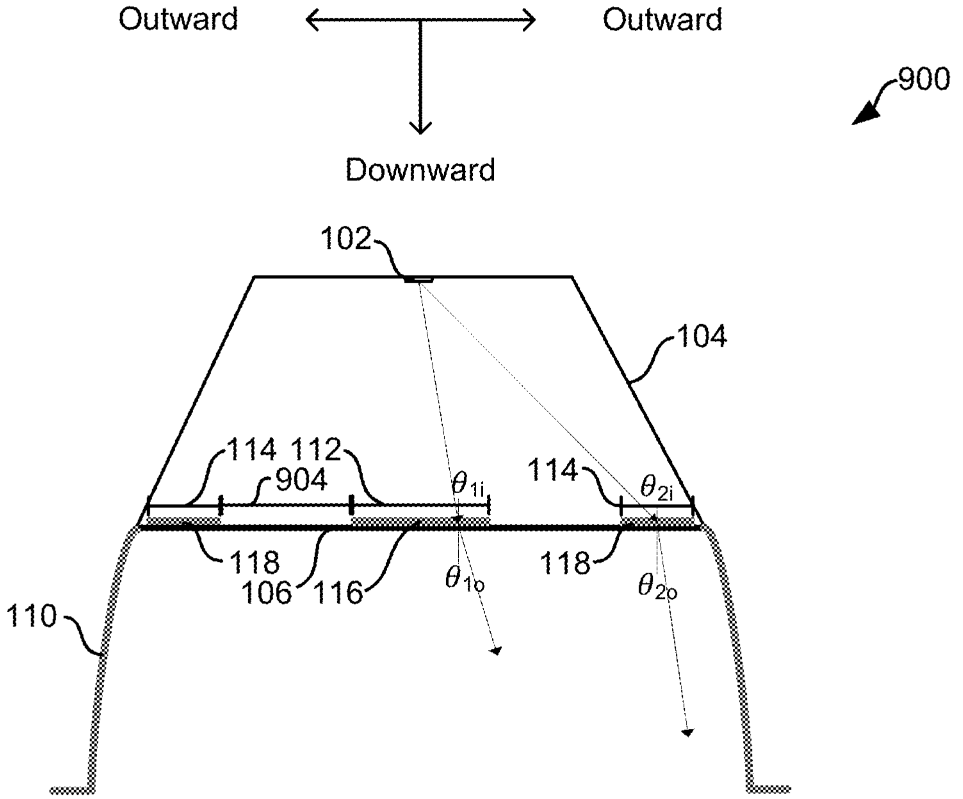
FIG. 9 depicts sample light paths of an embodiment of a light fixture.

FIG. 9 is a schematic of light transmitting through different portions of an embodiment of a light fixture 900. An optic 106 comprises a first region 112 and a second region 114. Light from a light source 102 is transmitted directly to the optic 106 or reflected to the optic 106 by the reflector 104.

A first portion of light of light from the light source 102 passing through the first ridge structure 116 in the first region 112 is refracted and redirected outward from the center. For example, the light incident on the first region 112 has an incident angle $\theta_{1i}$, and light exiting through the first region 112 of the optic 106 has an exit angle $\theta_{1o}$ relative to a normal line of the optic, wherein $|\theta_{1o}|>\theta|_{1i}|$. Put another way, light has a greater outward component (away from center) after passing through the first region 112 than light incident on the first region 112 of the optic 106.

A second portion of light from the light source 102 passes through the second ridge structure 118 in the second region 114 (e.g., directly or after reflecting from the reflector 104) and is directed by the second ridge structure 118 in a downward direction (e.g., having less of an outward component than light incident on the second ridge structure). Light incident to the optic 106 at the second region 114 has an incident angle $\theta_{2i}$ and an output angle $\theta_{2o}$ relative to the normal line of the optic 106. In some configurations, the output angle $\theta_{2o}$ is equal to or less than +/−5, 10, 15, 20, or 25 degrees. In some configurations, the output angle $\theta_{2o}$ has a smaller magnitude than the incident angle $\theta_{2i}$ (e.g., $|\theta_{2o}|<|\theta_{2i}|$) and/or has an inward component.

The optic 106 modifies light from the light source 102 resulting in flat illumination with consistent color temperature. The combination of light from the first region 112 and the second region 114 is primarily formed through the optic 106, rather than predominantly using the trim 110. Thus, the optic 106 can be replaced for different lighting situations (e.g., to go from a 0.8 sc to a 1.2 sc) while providing consistent color temperature.

In some embodiments, the second region 114 adjoins the first region 112, without a middle region between the first region 112 and the second region 114. In some embodiments, the optic 106 further comprises a middle region 904, disposed between the first region 112 and second region 114. In some configurations, the middle region 904 comprises no ridges. In some configurations, the middle region 904 comprises ridges that are different in cross-sectional shape than ridges in the first region 112 and/or the second region 114.

In some configurations, the first ridge structure 116 performs like a diverging, or negative, lens; and/or the second ridge structure 118 performs like a converging, or positive lens (e.g., with perhaps some increased efficiency due to total internal reflection).

As illustrated in FIG. 1, the optic 106 has a first surface 132 facing the one or more light sources 102 and a second surface 134 opposite the first surface 132. In some embodiments, all ridges, including the first ridge structure 116, the second ridge structure 118, and the possible ridges in the middle region 904 are on the first surface 132. In some embodiments, texture is on the second surface 134 of the optic.

Figure 10:
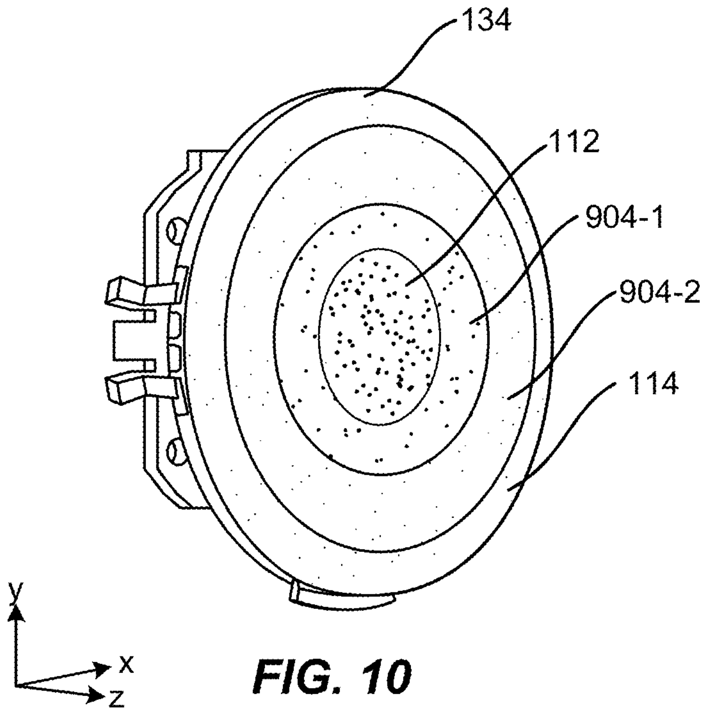
FIG. 10 depicts a surface of an embodiment of an optic.

FIG. 10 illustrates an embodiment of texture of an optic. The first region 112 has a first texture (e.g., frosting or etching), the second region 114 has a second texture different than the first texture. A first middle region 904-1 has a third texture, and a second middle region 904-2 has a fourth texture. The first middle region 904-1 is closer to a center of the optic than the second middle region 904-2. The texture is on the second surface 134 of the optic. In the embodiment shown in FIG. 10, rougher texture is in the middle and lighter texture toward the edge. Rougher texture in the first region 112 can cause more scattering of cool light to the middle region of the beam, and/or less texture in the second region 114 can cause less warm light to scatter to the trim to be reflected to the middle region of the beam.

Though FIG. 10 depicts rougher texture in the first region 112, in some configurations texture is lighter in the center and rougher the farther away from the center. For example, the third texture of the first middle region 904-1 is rougher than the first texture in the first region 112; the fourth texture of the second middle region 904-2 is rougher than the third texture of the first middle region 904-1; and the second texture of the second region 114 is rougher than the fourth texture of the second middle portion 904-2.

In some configurations, the outer second face has only two textures: a first texture region in the center (opposite and same or slightly larger diameter than the first region 112 on input face) and a second texture region across the remainder of the lens (e.g., the fourth texture and/or the third texture are the same as the second texture); the second texture in the second region 114 is rougher than the first texture in the first region 112. The first texture of the first region 112 can be lighter than the second texture of the second region 114 to give more control to divert the cooler light to properly mix with the light passing through the rougher outer region. For example, the ridges and texturing of the second region 114 are set and ridges of the first region 112 are designed to spread light to create a uniform (intensity and color) beam. In some embodiments, the first region 112 has no texture. For example, the first region 112 has a clear spot in the center, surrounded by the first texture. In some embodiments, the optic 134 has the same texture across the optic 134 (e.g., the first texture, the second texture, the third texture, and the fourth texture are the same).

The texture of the optic may be, but not limited to, surface roughness or texture (e.g., by etching the optic, sandblasting the optic, and/or depositing a material on the optic). For example, surface deformation or destruction can be used to roughen and/or alter a surface to refract and/or scatter light. In some embodiments, a tool is used to scratch, bead blast, or chemical etch a surface that imprints a pattern and/or texture in a molded plastic part. In some embodiments, the first surface of the optic is textured in addition to, or in leu of, texturing the second surface 134. In some configurations, the middle region 904 has rougher or finer texture than the first region 112 and/or the second region 114.

In some situations, surface roughness can be measured by how much light from a laser is diverted passing through the optic (e.g., without ridges). For example, the first texture can result in zero to 30 degree diversion (e.g., 5, 10, or 15 degrees), and the second texture can result in a greater diversion, such as between 30 and 70 degrees or 50 to 70 degrees (e.g., 50 or 60 degrees).

Figure 11A:
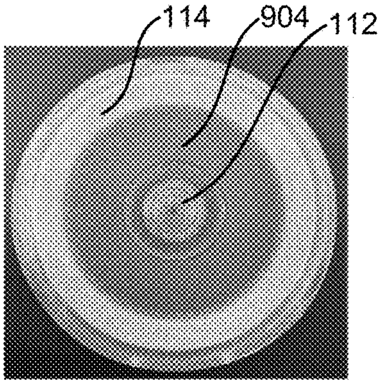
FIGS. 11A, 11B, 11C, 11D, 11E, 11F, 12A, 12B, 12C, 13A, 13B, and 13C are images of embodiments of an optic.
Figure 11B:
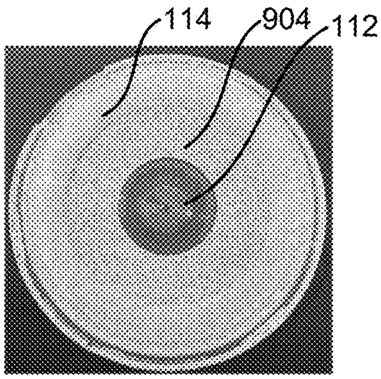
Figure 11C:
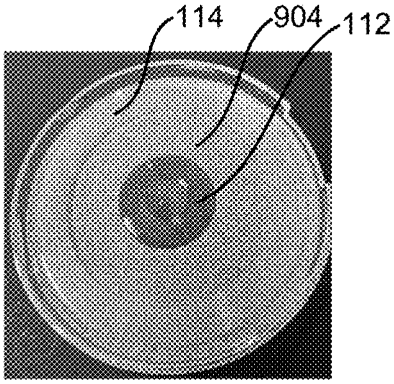

FIG. 11A is a view of the second surface of an optic according to an embodiment. FIGS. 11B and 11C are views of the first surface of the optic from different viewing angles. A first region 112, a second region 114, and a middle region 904 are shown in FIGS. 11A-C. The first region 112 comprises a first ridge structure and the second region 114 comprises a second ridge structure on the first surface. The middle region 904 comprises no ridges. The optic comprises a combination of texture and ridge structures for beam control. The first region 112, the second region 114 and the middle region 904 collectively produce a light output with a desired distribution.

Figure 11D:
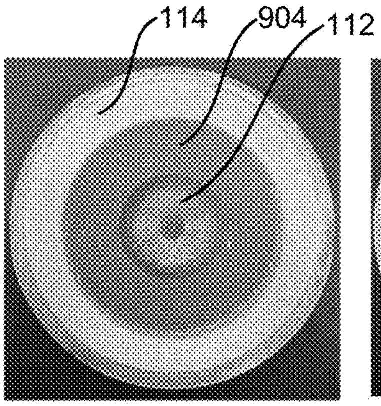
Figure 11E:
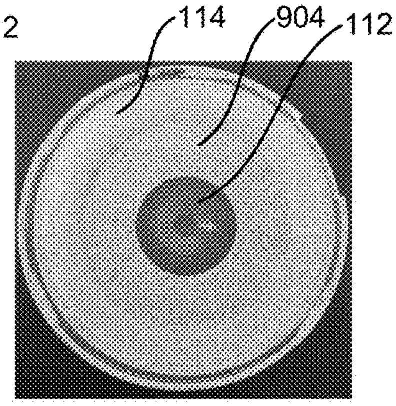
Figure 11F:
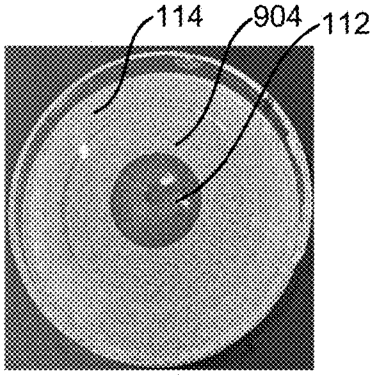

FIG. 11D is a view of the second surface of another embodiment of an optic. FIGS. 11E and 11F are views of the first surface of the optic in FIG. 11D from different view angles. Compared to the embodiment illustrated in FIGS. 11A-11C, ridges in the first region 112 of the optic illustrated in FIGS. 11D-11F do not begin as close to the center of the optic. For example, the optic in FIG. 11D can be used for a different spacing criterion than the optic in FIG. 11A.

Figure 12A:
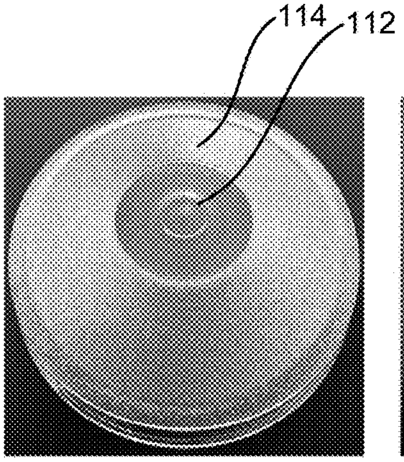
Figure 12B:
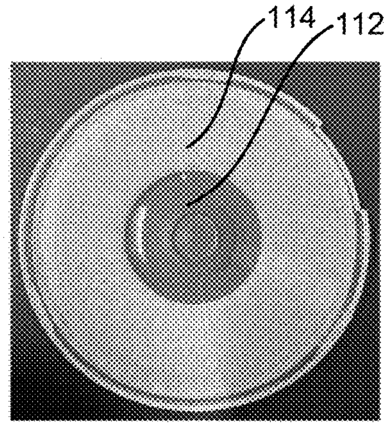
Figure 12C:
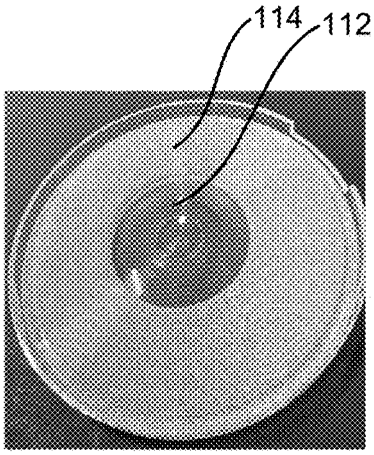

FIG. 12A is a view of the second surface of an optic according to yet another embodiment. FIGS. 12B and 12C are views of the first surface of the optic in FIG. 12A from different viewing angles. In this embodiment, the second region 114 adjoins the first region 112, without a middle region between. As illustrated in FIGS. 12A-12C, the first region 112 has little or no texture and the second region 114 has heavier texture than the first region 112. The first region 112 and the second region 114 comprise ridges (though of different shapes). The ridges of the second region 114 are adjacent to ridges of the first region 112.

Figure 13A:
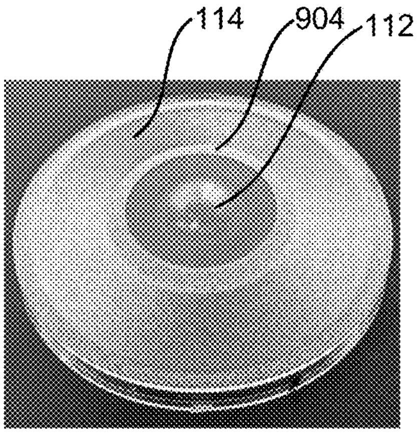
Figure 13B:
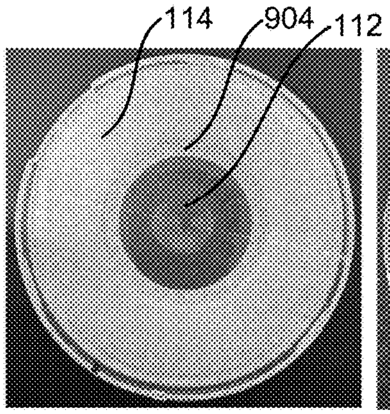
Figure 13C:
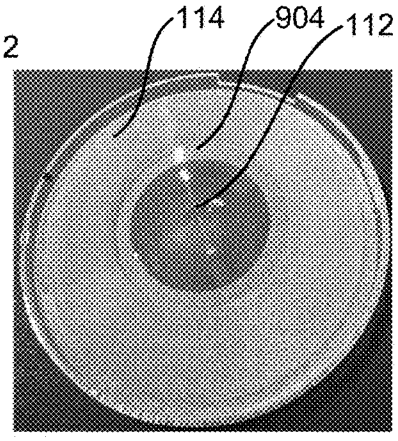

FIGS. 13A-13C illustrate another embodiment of an optic, wherein FIG. 13A is a view of the second surface of the optic and FIGS. 13B and 13C are views of the first surface of the optic from different viewing angles. The optic comprises a first region 112, a second region 114, and a middle region 904. Both the first region 112 and the second region 114 have ridges while the middle region 904 does not have ridges. The first region 112 is clear (e.g., no texture)

The first ridge structure in the first region 112 deflects light to away from the center of the optic. The second ridge structure in the second region 114 deflects light away from the trim. By altering the ridge structures, a desired pattern can be changed without altering the reflector and/or altering the trim. In a system comprising the optic and a trim, the optic can reduce the design constraints of the trim of the light fixture and/or improve the efficiency of light illumination. Light alteration by the trim can show up as contribution from focusing light in a middle region of the beam and/or as a ring of light, batwing, and/or cardioid shape. Using the second ridge structure can reduce warmer light deflected to the middle region of the beam by the trim. Using the first ridge structure can deflect cooler light from the center to the outer direction to form a flatter illumination that is color balanced. The contribution of the trim, an inner texture region (e.g., the first region 112), an outer texture region (e.g., the second region 114), and/or the ridge structures create a target light distribution. In some configurations, the optic is used in a system without a trim.

In some configurations, the first texture, second texture, third texture, and/or fourth texture are rough over a majority of the optic (e.g., texture is equal to or greater than 60%, 75%, 85%, or 90% and/or equal to or less than 100%, 95%, or 90% of a surface area of the optic), which can help the optic appear uniform (e.g., to provide a smooth appearance when viewed directly) and/or provide hiding of the lamp when viewed at high angles. In some embodiments, combining an outer region (e.g., second region 114) that has a heavy texture with a center region (e.g., first region 112) that has a lighter (or no) texture can achieve a desired pattern. When viewed while installed, different versions of the optic can appear similar to a person in a space illuminated by the optic while still producing different beams from the fixtures.

In some embodiments, the optic further comprises an edge having no textures (e.g., from a ring holding the optic while the optic is textured). In some configurations, the edge has at least one notch structure (e.g., for installation with a reflector and/or trim).

In some embodiments, texture roughness is quantified by measuring a difference between the highest peak and the lowest valley within a sample length to obtain a maximum height of the sample profile; and the maximum height of a sample of the second texture is equal to or greater than 1.25, 1.5, 2, 3, 5, or 10 times a maximum height of a sample of the first texture and/or equal to or less than 5, 10, or 100 times the first texture.

Features can include surface texture, such as adding material to a surface of an optic, removing material from a surface of an optic (e.g., etching), and/or molding a lens to create surface variations (e.g., random, arbitrary, or non-symmetrical variations) or roughness. Features can include optical elements such as lenslets. Features can be variations within the thickness of the optic, such as optical elements or ion implantation in-between optical surfaces of the optic. Features can be on an optical surface, below an optical surface, or a combination (e.g., on a surface and extending below or into the optic).

The optic 106 can provide flat illumination with consistent color. In some embodiments, flat illumination is no more than 10% or 20% variance for a 30 or 40 degree span (e.g., from −20 degrees to 20 degrees for light arranged to direct illumination downward) in a photometric polar diagram. The optic can also provide consistent color illumination. In some embodiments, color temperature difference (delta) of the flat illumination is equal to or less than 25K, 35K, 40K, 45K, 50K, 75K, 100K, or 125K, as measured from center to edge. A tolerable amount of color temperature delta can be application specific.

In some embodiments, a lamp, such as a multi-LED light source, faces the z-direction and emits light in the z-direction (e.g., with some spread in the x and y dimensions). The lamp is inside the housing. The optic comprises the first ridge structure and the second ridge structure on the inside surface (e.g., a surface of the optic closest to and/or facing the multi-LED light source 508) and texture structure on the outside surface. The optic is arranged so that light from the lamp passes through the inside surface and the outside surface (e.g., first through the inside surface and then through the outside surface). In some embodiments, the optic may be used in front of a composite light source. For example, a multi-LED light source comprises 12 to 48 LEDs, or a fewer or greater number of LEDs.

In some embodiments, the second surface of the optic comprises a uniform texture. Optics with a textured surface can scatter and/or redistribute light, helping to modify intensity, direction, or distribution. Textured surfaces can be designed to produce specific patterns or levels of diffusion. EVO4, EVO6 and ICO4 products from Acuity Brands are example of downlights using a texture only based approach to control illumination (e.g., https://www.acuitybrands.com/products/detail/1657499/gotham-lighting/evor-4-round-downlight/general-illumination-led-downlight). These products rely on the trim to provide the generally batwing shape. Increasing diffusion of the lens widens the beam feeding the trim 110, thereby widening the batwing shape.

In some embodiments, the first region can have an elliptical shape; the second region can have an elliptical shape; the first region is inside the second region; and the second region is concentric with the first region. For example, the first region and the second region are concentric circles sharing the same center, the first region being inside the second region and the second region is an annulus shape around the first region. The middle region can have an elliptical shape (e.g., circular) and be concentric with the first region and/or the second region.

Using multiple regions of an optic (e.g., texture and/or ridge shapes) can put more optical control into the optic instead of relying on the trim for illumination shaping. The addition of a trim at the output of the optic can regress an output face of the optic to provide glare control and/or cutoff, but the trim will often alter the shape of the light emanated by the optic. Shorter trims tend to focus more light in the center of the beam and taller trims tend to form batwings or make holes in a center of the beam, but that can be changed depending on trim geometry. By using a multi-region optic, the same housing and/or trim can be used and the optic changed to produce different beam patterns. Batwing and narrow beams can be made by simply changing the optic and using the same trim.

Contributions of light shaping from the trim can limit how a beam is shaped. By purposely limiting how much light hits the trim (e.g., by using ridges in the second region 114 in FIG. 6A), the trim shape contributes less to the beam profile (e.g., the trim can be taller without affecting the beam profile as much). By reducing the trim impact to beam forming, the beam can be mostly formed by the optic. In some situations, a trim shape is used and the optic designed to work with the trim (e.g., as discussed above). In some embodiments, the trim height is equal to or greater than 2, 2.5, 3, or 3.5 inches and/or equal to or less than 5, 6, 8, or 12 inches).

In some embodiments, a reflector may be used to hold the multi-region optic in place. The reflector can server two functions: 1) it can hold the multi-region optic in the correct z-location so that there is a repeatable z-location to design the center region to; and/or 2) it can improve an efficiency of the optical system. When the optic is spaced away from the lamp (e.g., LEDs), there is a high angle light emitted from the LEDs that misses the optic (e.g., depending on the diameter of the designed optic and the Z height). By adding in a reflector, the light that would have not been collected by the multi-region optic can be turned in a generally "forward" or "downward" direction, so that it contributes to the final fixture output. In some embodiments, the lens is held so close to the LEDs that not much light misses the lens (e.g., light that misses the optic is equal to or less than 35%, 30%, 25%, 20%, 15%, 10%, or 5%) and the beam from the reflector is generally not shaped much (e.g., generally Lambertian). In some embodiments, the reflector is made taller in order to space the multi-region optic farther away from the lamp (e.g., to keep the plastic lens cooler so the lens is moved farther away from the lamp). In this case, much more light will hit the reflector surface. Thus, the reflector surface (specular vs semi-specular vs diffuse) and/or shape is taken into consideration to tailor the specific base distribution coming from the reflector so the multi-region lens can work properly and/or the center region can be used to overcome the contribution from the reflector, depending on the desired beam target. This idea is similar to working with light coming from the trim. The combination of the reflector and optic can be designed to function properly with the trim in place. Accordingly, a reflector and/or a trim are used in some embodiments. Height/profile of the trim are not critical, and/or textures and/or refracting features in regions of the lens can be taken into account for the performance of the reflector.

Figure 14:
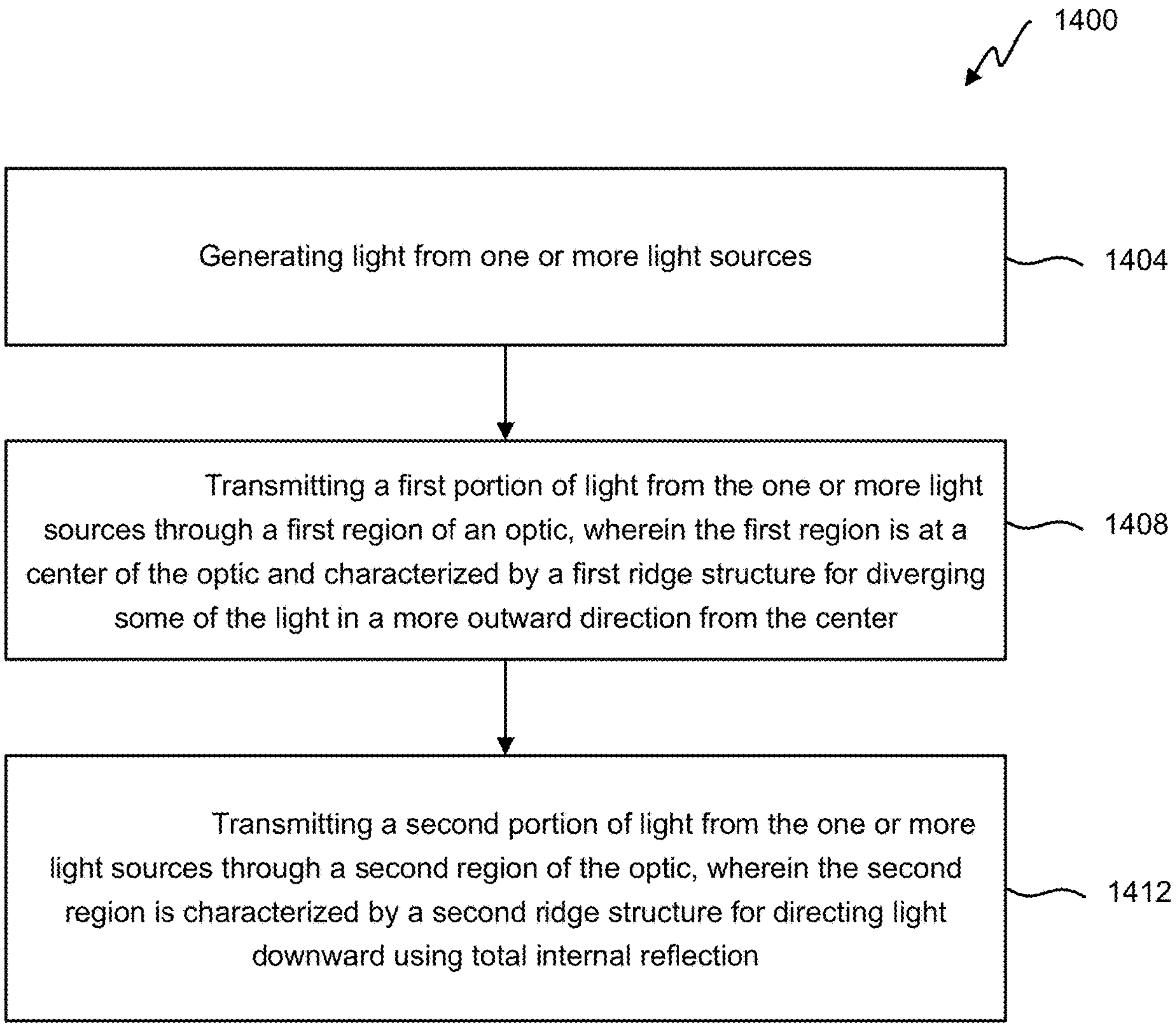
FIG. 14 illustrates a flowchart of an embodiment of a process of using a light fixture with a multi-region optic.

FIG. 14 illustrates a flowchart of an embodiment of a process 1400 of using a multi-region optic. Process 1400 begins in step 1404 with generating light from one or more light sources (e.g., using a multi-LED lamp). For example, light is generated by light source 102 in FIG. 1.

In step 1408, a first portion of light from the one or more light sources is transmitted through a first region of an optic, wherein the first region is at a center of the optic and characterized by a first ridge structure. The first ridge structure diverges some of the first portion of light in more outward direction from the center. For example, a first portion of light is transmitted through the first region 112 in FIG. 9 and light transmitting through the first region 112 has a greater outward component than light incident on the optic at the first region 112.

In step 1412, a second portion of light from the one or more light sources is transmitted through a second region of the optic (e.g., concurrently with transmitting the first portion of light through the first region), wherein the second region is at an outer portion of the optic. The second region is characterized by a second ridge structure arranged for directing some of the second portion of light in a less outward direction (e.g., more downward), using total internal reflection (e.g., see FIG. 8B), wherein a direction from the one or more light sources toward the optic defines a downward direction (downward can be parallel to an optical axis of the lens), and a direction orthogonal to the optical axis of the lens is outward. For example, a second portion of light is transmitted through the second region 114 of the optic in FIG. 9, and some of the second portion of light has a less outward component than light incident on the optic at the second region 114.

The first ridge structure and/or the second ridge structure are operative to produce a composite light distribution from the one or more light sources. For example, the first region 112 and the second region 114 are operative to produce a composite light distribution (e.g., as shown in FIG. 3). The first ridge structure is different from the second ridge structure.

In some configurations, the second ridge structure comprises a first ridge 812 having a first side 814 and a second side 816 farther from the center than the first side 814, and the first ridge refracts light at the first side 814 from the one or more light sources into the first ridge and then reflects the light downward (e.g., less outward) with the second side 816 using total internal reflection at the second side 816.

Various features described herein, e.g., methods, apparatus, computer-readable media and the like, can be realized using a combination of dedicated components, programmable processors, and/or other programmable devices. Some processes described herein can be implemented on the same processor or different processors. Where some components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Details are given in the above description to provide an understanding of the embodiments. However, it is understood that the embodiments may be practiced without some of the specific details. In some instances, well-known circuits, processes, algorithms, structures, and techniques are not shown in the figures.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of “a”, “an”, or “the” is intended to mean “one or more” unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for a light fixture comprising:

one or more light sources arranged on a mount; and an optic comprising:

a first ridge structure, wherein the first ridge structure is disposed in a first region at a center of the optic, for diverging some light from the one or more light sources in a more outward direction from the center;

a second ridge structure disposed in a second region at an outer portion of the optic for directing some light from the one or more light sources in a less outward direction using total internal reflection, wherein a direction from the one or more light sources toward the optic defines a downward direction and a direction orthogonal to downward is outward; and a reflector between the mount and the optic.

2. The system of claim 1, wherein the second region is concentric with the first region.

3. The system of claim 1, wherein the second ridge structure comprises a series of ridges arranged to converge some light from the one or more light sources inward, toward the center.

4. The system of claim 1, wherein:

the optic has a first surface and a second surface opposite the first surface;

the first surface is arranged to face the one or more light sources; and both the first ridge structure and the second ridge structure are part of the first surface.

5. The system of claim 1, wherein the first region has a first texture, the second region has a second texture, and the first texture is different from the second texture.

6. The system of claim 5, wherein the first texture is finer than the second texture.

7. The system of claim 1, wherein the optic further comprises a third region between the first region and the second region, wherein the third region comprises no ridges.

8. The system of claim 7, wherein:

the first region has a first texture;

the second region has a second texture;

the third region has a third texture;

the first texture is different from the second texture and the third texture; and the second texture is different from the third texture.

9. The system of claim 1, wherein the optic has a first surface facing the one or more light sources and a second surface opposite the first surface, and the second surface comprises a uniform texture.

10. The system of claim 1, wherein the second region adjoins the first region.

11. The system of claim 1, wherein:

the second ridge structure comprises a first ridge having a first side and a second side;

the first side is closer to the center than the second side;

the first side is arranged to refract some light from the one or more light sources into the first ridge; and the second side is arranged to reflect light less outward than light incident on the first side and out of the first ridge using total internal reflection.

12. The system of claim 11, wherein the first ridge is a curved ridge in an elliptical shape.

13. The system of claim 1, wherein:

the first ridge structure comprises a first subset of ridges arranged to diverge some light from the one or more light sources in a more outward direction from the center; and the first ridge structure further comprises a second set of ridges arranged to direct some light from the one or more light sources in a more inward direction, toward the center of the optic, after light passes through the optic.

14. The system of claim 1, the second ring structure comprising one or more ridges arranged to diverge some light from the one or more light sources in a more outward direction from the center.

15. The system of claim 1, further comprising a trim, wherein the optic is arranged between the reflector and the trim.

16. The system of claim 15, wherein the trim has a height with respect to a diameter of the optic to provide a 55 degrees or smaller cutoff angle.

17. A method comprising:

generating light from one or more light sources, wherein the one or more light sources are arranged on a mount, and a reflector is between the mount and an optic;

transmitting a first portion of light from the one or more light sources through a first region of the optic, wherein:

the first region is at a center of the optic; and the first region comprises a first ridge structure arranged for diverging at least some of the first portion of light in a more outward direction from the center; and transmitting a second portion of light from the one or more light sources through a second region of the optic, wherein:

the second region is at an outer portion of the optic compared to the first region; and the second region comprises a second ridge structure arranged to direct at least some of the second portion of light downward and less outward, using total internal reflection, wherein a direction from the one or more light sources toward the center of the optic defines a downward direction, and wherein the first portion of light or the second portion of light includes light from the one or more light sources reflected by the reflector.

18. The method of claim 17, wherein:

the second ridge structure comprises a first ridge having a first side and a second side;

the first side is closer to the center than the second side;

the first side is arranged to refract some light from the one or more light sources into the first ridge; and the second side is arranged to reflect light less outward than light incident on the first side and out of the first ridge using total internal reflection.

19. The method of claim 17, wherein the optic is arranged to provide flat illumination from the one or more light sources.

20. An optic for a light fixture comprising:

a first ridge structure, wherein the first ridge structure is disposed in a first region at a center of the optic, for diverging some light from one or more light sources in a more outward direction from the center; and a second ridge structure disposed in a second region at an outer portion of the optic for directing some light from the one or more light sources in a less outward direction using total internal reflection, wherein a direction from the one or more light sources toward the optic defines a downward direction and a direction orthogonal to downward is outward, and wherein the optic is configured to be coupled with a housing having the one or more light sources on a mount and a reflector between the mount and the optic.

* * * * *